United States Patent [19]

Sakurai

[11] Patent Number: 5,151,570
[45] Date of Patent: Sep. 29, 1992

[54] REVOLUTE WELDING ROBOT

[75] Inventor: Hiromi Sakurai, Nagoya, Japan

[73] Assignee: Mitsubishi Jidosha Kogyo Kabushiki Kaisha, Tokyo, Japan

[21] Appl. No.: 793,813

[22] Filed: Nov. 18, 1991

[30] Foreign Application Priority Data

Nov. 22, 1990 [JP] Japan .................. 2-315734

[51] Int. Cl.$^5$ ............................. B23K 11/36
[52] U.S. Cl. .................... 219/86.25; 901/42
[58] Field of Search ........ 219/86.25; 901/42; 29/430, 466, 469; 228/4.1, DIG. 1, 49.1, 49.2

[56] References Cited

U.S. PATENT DOCUMENTS 4,855,560 8/1989 Sonoda et al. ............... 901/42
5,081,337 1/1992 Di Rosa ................... 219/86.25

FOREIGN PATENT DOCUMENTS 53-34650 3/1978 Japan ................... 219/86.25
60-113783 6/1985 Japan ................... 901/42

Primary Examiner—Geoffrey S. Evans
Attorney, Agent, or Firm—Abelman Frayne & Schwab

[57] ABSTRACT

A revolute welding robot including a base table provided with a first electrode at one end and an upright column, a slide arm with its rear end supported movable in the longitudinal direction of the column and its front end horizontally extending to the first electrode side of a bed, slide arm drive means disposed between the column and the slide arm, a swing arm connected to the front end of the slide arm so that the rear end is swingable in a vertical plane, swing arm drive means disposed between the slide arm and the swing arm, an electrode bracket with its rear end connected to the front end of the swing arm and swingable in a vertical plane and having a second electrode provided at the front end and opposing the first electrode, electrode bracket drive means disposed between the slide arm and the electrode bracket, and electrode moving means disposed at least one of the bed side and the electrode bracket side so that the first and second electrodes withdrawably oppose each other.

The robot arm unit has increased degrees of freedom to be adapted to an increased number of car models and variations.

17 Claims, 12 Drawing Sheets

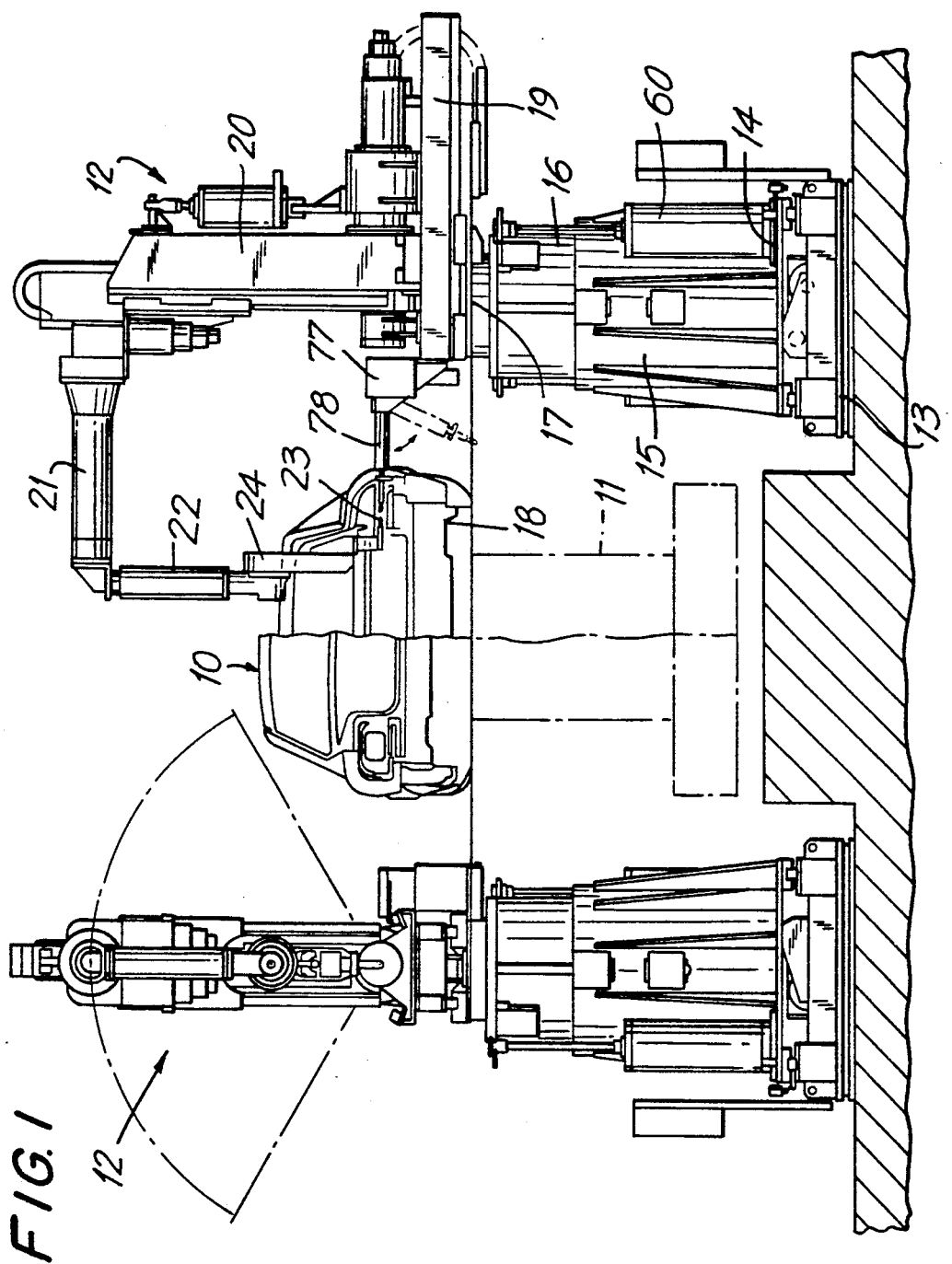

REVOLUTE WELDING ROBOT

FIELD OF THE INVENTION

This invention relates to a revolute welding robot for joining panels in an automobile body assembly line.

DESCRIPTION OF THE PRIOR ART

Heretofore, in an automobile body assembly line, when, for example, a rear frame (so-called perimeter frame) is joined by welding with a rear wheel house inner, a dedicated hydraulic welding robot is required according to the car model or variation having a spot welding gun, as shown in FIG. 13(A), (B), and (C).

Specifically, in welding the rear portion of the perimeter, as shown in FIG. 13(A), two large-sized hydraulic robots 1A and 1A, of which robot arm units can be inserted from the trunk lid (or tail gate) opening, are used for either a 2-door or 4-door model. On the other hand, in welding the front portion of the perimeter, for a 4-door model having a rear shelf 2, as shown in FIG. 13(B), two simple hydraulic robots 1B and 1B, of which robot arm units can be inserted from the rear door opening, are used. For a 2-door model, as shown in FIG. 13(C), two simple hydraulic roots 1C and 1C, of which robot arm units can be inserted from the front door opening, are used (Japanese Patent Publication Laid-open 63-97375/1988).

As described above, since, in the prior art process for welding panels of the body, dedicated hydraulic welding robots having spot welding guns according to the model or variation have been used, the process is less flexible and the applicable models or variations are limited, resulting in increased process steps and low productivity. Furthermore, since the robots are of a hydraulic type, they have involved problems in precision, function, and reliability, with low maintainability.

Furthermore, Japanese Patent Publication Laid-open 63-5885/1988 discloses a technology for spot welding using individual electrode tips handled by independent robots.

In this technology, it is necessary to locate both robots opposite to each other on both sides of a workpiece, and it cannot be used for welding relatively large-sized workpieces like an automobile body because it is difficult to locate the robots. Furthermore, this technology has a problem of very difficult positioning of electrodes because the individual electrode tips are driven by different robots.

Therefore, it is a primary object of the present invention to provide a revolute welding robot, which has improved flexibility and productivity and enhanced reliability and maintainability.

SUMMARY OF THE INVENTION

In accordance with the present invention which attains the above object, there is provided a revolute welding robot comprising a base table provided with a first electrode at one end and an upright column, a slide arm with its rear end supported movable in the longitudinal direction of the column and its front end horizontally extending to the first electrode side of the bed, slide arm drive means disposed between the column and the slide arm, a swing arm connected to the front end of the slide arm so that the rear end is swingable in a vertical plane, swing arm drive means disposed between the slide arm and the swing arm, an electrode bracket with its rear end connected to the front end of the swing arm and swingable in a vertical plane and having a second electrode provided at the front end and opposing the first electrode, electrode bracket drive means disposed between the slide arm and the electrode bracket, and electrode moving means disposed at least one of the bed side and the electrode bracket side so that the first and second electrodes withdrawably oppose each other.

With the above-described arrangement, the robot arm unit has increased degrees of freedom to be adapted to an increased number of car models and variations.

BRIEF DESCRIPTION OF THE DRAWINGS

FIG. 1 is a schematic front view showing an embodiment of the present invention.

DESCRIPTION OF THE PREFERRED EMBODIMENTS

An embodiment of the present invention will now be described with reference to the drawings. Referring to FIG. 1, in a body assembly line, revolute welding robots 12 and 12 according to the present invention are disposed on the floors at both sides of a conveyor 11 for carrying a body panel 10 to carry out welding of a perimeter frame.

Figure 11:
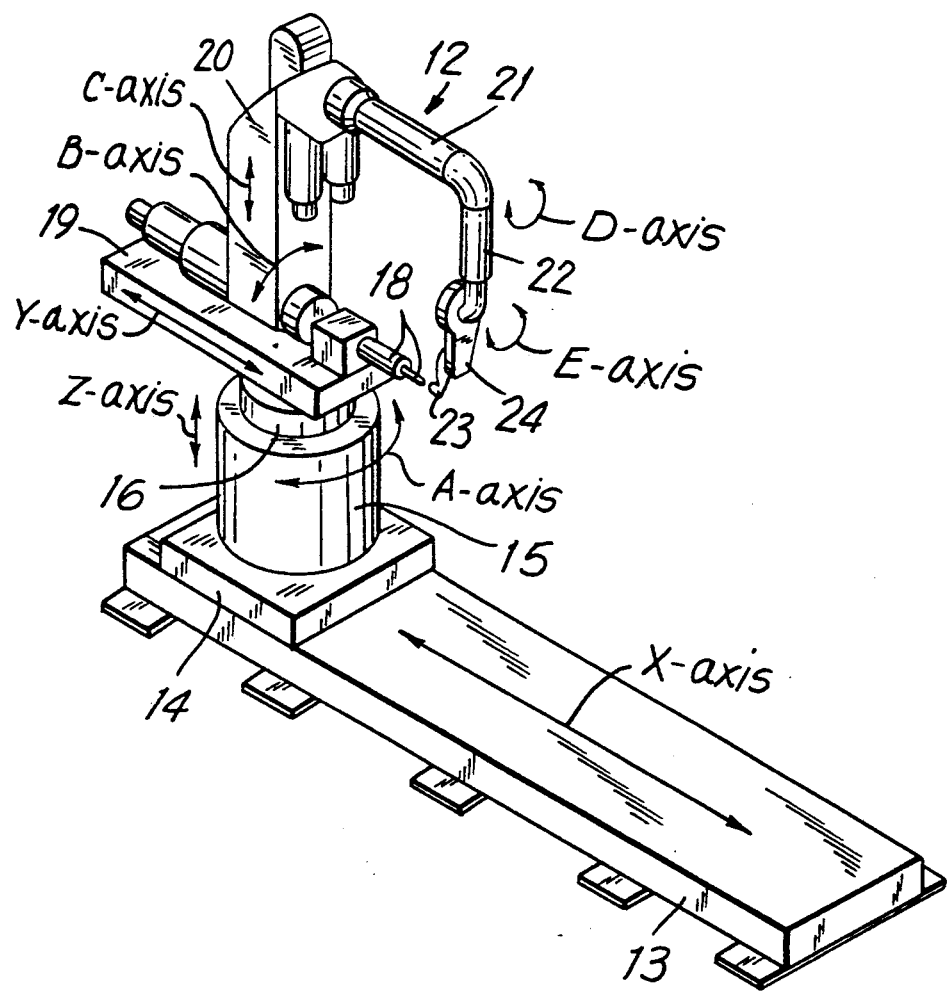
FIG. 11 is a schematic perspective outer view of a welding robot showing moving directions of individual axes.

As shown also in FIG. 11, the revolute welding robot 12 is provided with a first slide table 14 which can move horizontally (X-axis in FIG. 11) on a bed 13 parallel to the body assembly line, a vertically movable cylinder 16 supported to be vertically movable (Z-axis in FIG. 11) on the first slide table 14 through an outer cylinder 15, a swivel table 17 supported at the top end of the vertically movable cylinder 16 to turn horizontally (A-axis in FIG. 11), a second slide table 19 as a base table which is horizontally movable (Y-axis in FIG. 11) on the swivel table 17 and provided with a first electrode 18 at one end in the moving direction, a swing column 20 supported swingably (B-axis in FIG. 11) around the axis extending horizontally in the table moving direction, a slide arm 21 of which the rear end is supported to be movable in the longitudinal direction of the column (C-axis in FIG. 11) and the arm front end extends horizontally to the first electrode 18 side of the second slide table 19, a swing arm 22 of which the rear end is connected swingably in a vertical plane (D-axis in FIG. 11)

to the front end of the slide arm 21, and an electrode bracket 24 of which the rear end is connected swingably in a vertical plane (E-axis in FIG. 11) to the front end of the swing arm 22 and provided a second electrode 23 opposing the first electrode 18.

Figure 2A:
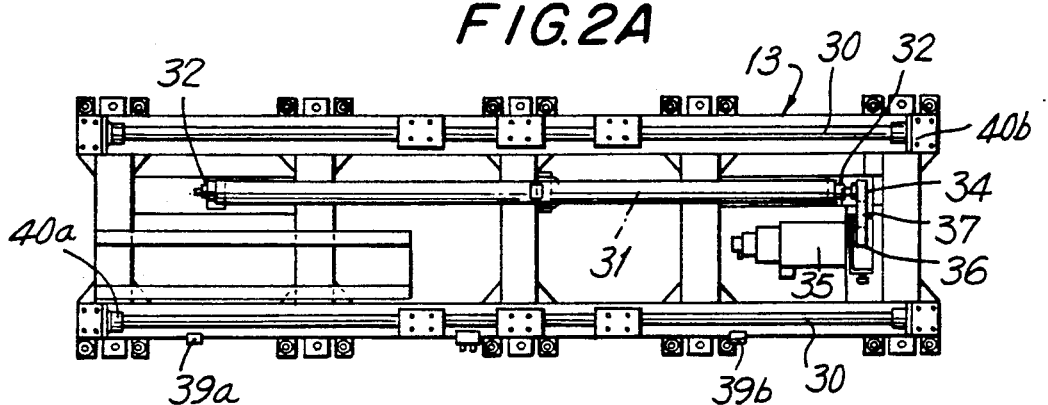
FIGS. 2(A) and (B) are individually schematic front and side views of a bed.
Figure 2B:
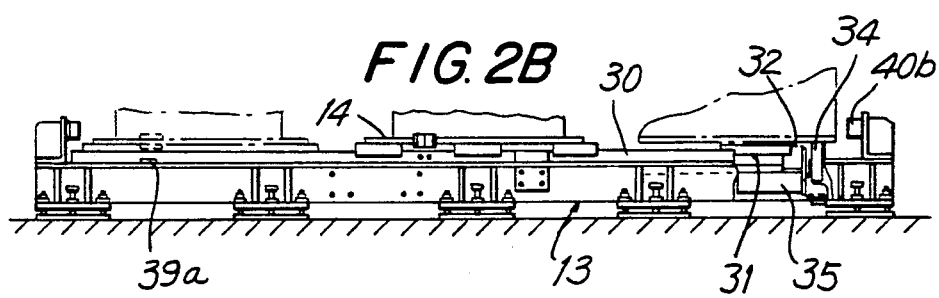
Figure 3:
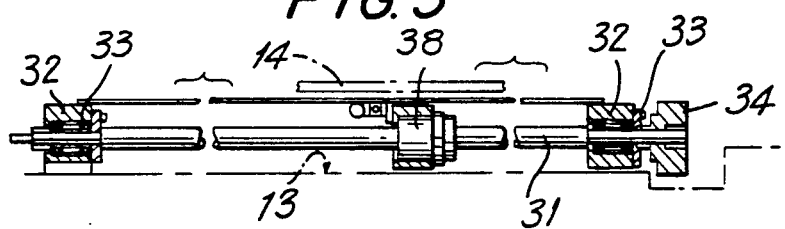
FIG. 3 is a schematic cross-sectional view of a ball screw mechanism of the bed unit.

On the bed 13, as shown in FIG. 2(A) and (B) and FIG. 3, two rails 30 and 30 are disposed parallel to the body assembly line, and a ball screw 31 is disposed between the rails 30 and 30 and parallel to the rail 30.

Both ends of the ball screw 31 are rotatably supported on a support bracket 32 on the bed 13 through a bearing 33, and a pulley 34 is mounted to one end of the ball screw 31. A timing belt 37 is provided between the pulley 34 and a pulley 36 mounted to an output shaft of a servo motor 35 on the bed 13.

A ball nut 38 engaging with the ball screw 31 is mounted to the bottom surface side of the of first slide table 14.

Therefore, the first slide table 14 is horizontally moved on the rail 30 by way of first drive means comprising the servo motor 35, the timing belt 37, the ball screw 31, and the ball nut 38.

In FIG. 2(A) and (B), numerals 39a and 39b indicate limit switches limiting the moving ends of the first slide table 14 and numerals 49a and 40b indicate stoppers.

Figure 4:
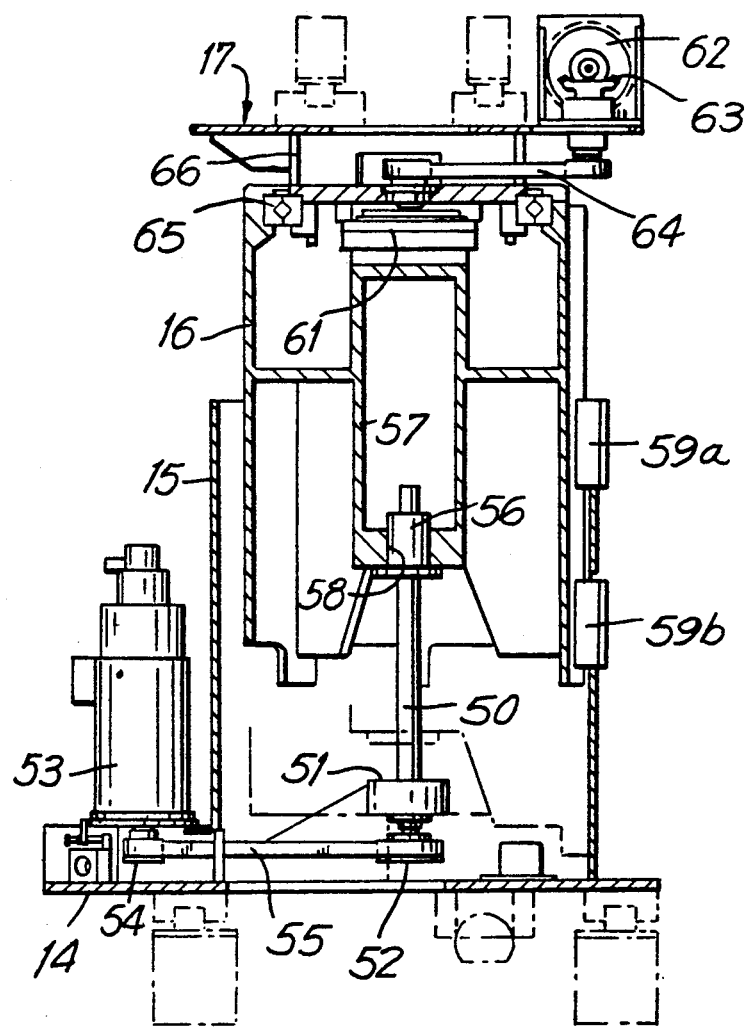
FIG. 4 is a schematic cross-sectional view showing a first slide table, a vertically movable cylinder, and a swivel table.

As shown in FIG. 4, a ball screw 50 is disposed upright at the center of the outer cylinder 15.

The ball screw 50 is supported at its bottom end side rotatably on a support bracket 51 on the first slide table 14, and a pulley 52 is mounted to the bottom end. A timing belt 55 is provided between the pulley 52 and a pulley 54 mounted to an output shaft of a servo motor 53 on the first slide table 14.

A ball nut 56 engaging with the ball screw 50 is mounted in a bottom opening 58 of a support cylinder 57 provided at the center of the vertically movable cylinder 16.

Therefore, the vertically movable cylinder 16 is vertically moved within the outer cylinder 15 by way of second drive means comprising the servo motor 53, the timing belt 55, the ball screw 50, and the ball nut 56.

In FIG. 4, numerals 59a and 59b indicate ascending guides which also act as rotation stoppers. A plurality of air cylinders 60 (FIG. 1) for weight balance are disposed between the upper surface of the first slide table 14 and the upper end flange portion of the vertically movable cylinder 16, located outside the outer cylinder 15.

Further, as shown in FIG. 4, a speed reducer 61 is mounted to the top end of the support cylinder 57, and the rotation force of the servo motor 62 mounted on the swivel table 17 is transmitted to the input shaft side of the speed reducer 61 through a bevel gear mechanism 63 and a timing belt 64.

The output shaft side of the speed reducer 61 is connected to the lower surface of the bottom wall of a bottomed support shaft 66 which is rotatably supported on the top opening of the vertically movable cylinder 16 through a bearing 65.

Therefore, the swivel table 17 horizontally turns on the vertically movable cylinder 16 by way of third drive means comprising the servo motor 62, the bevel gear mechanism 63, the timing belt 64, and the speed reducer 61.

Figure 5:
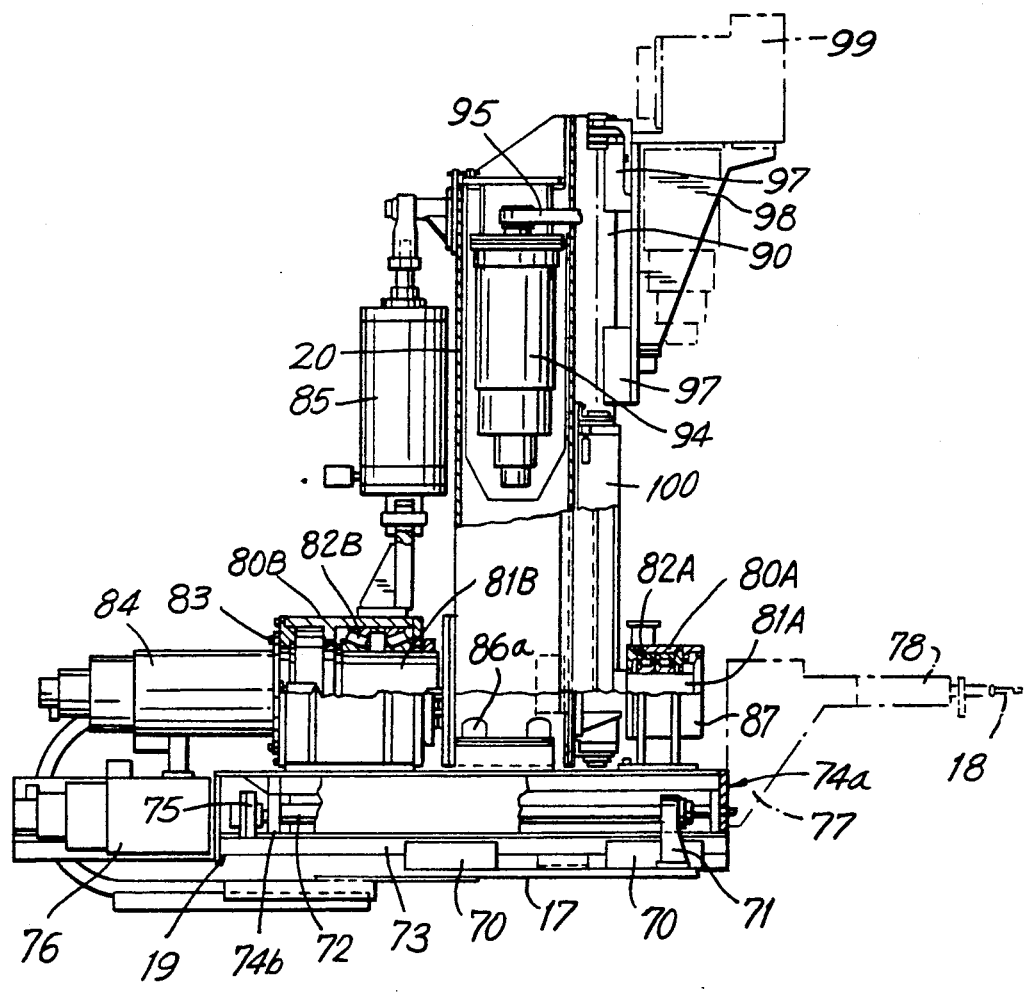
FIGS. 5, 6, and 7 are individually schematic side, plan, and front views of a second slide table and a swing column.
Figure 6:
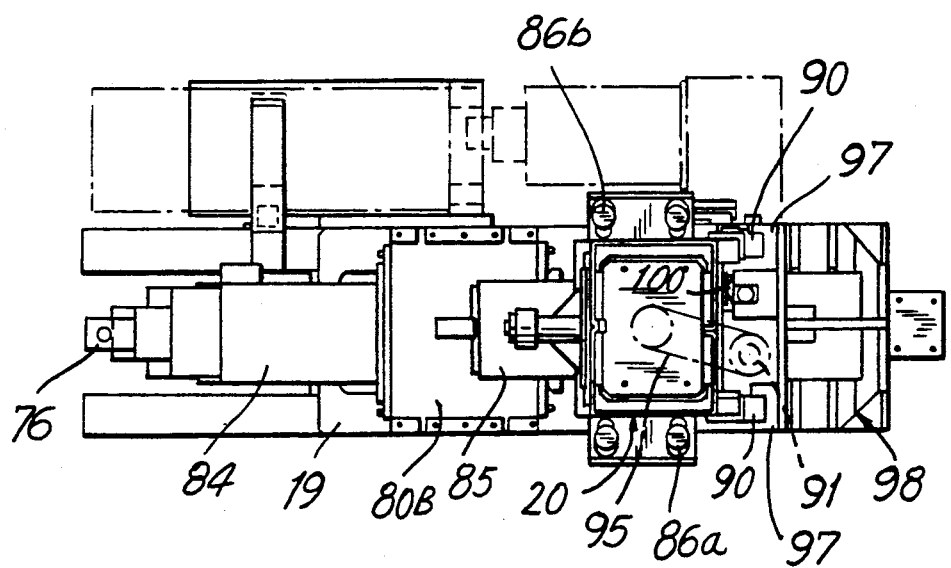
Figure 7:
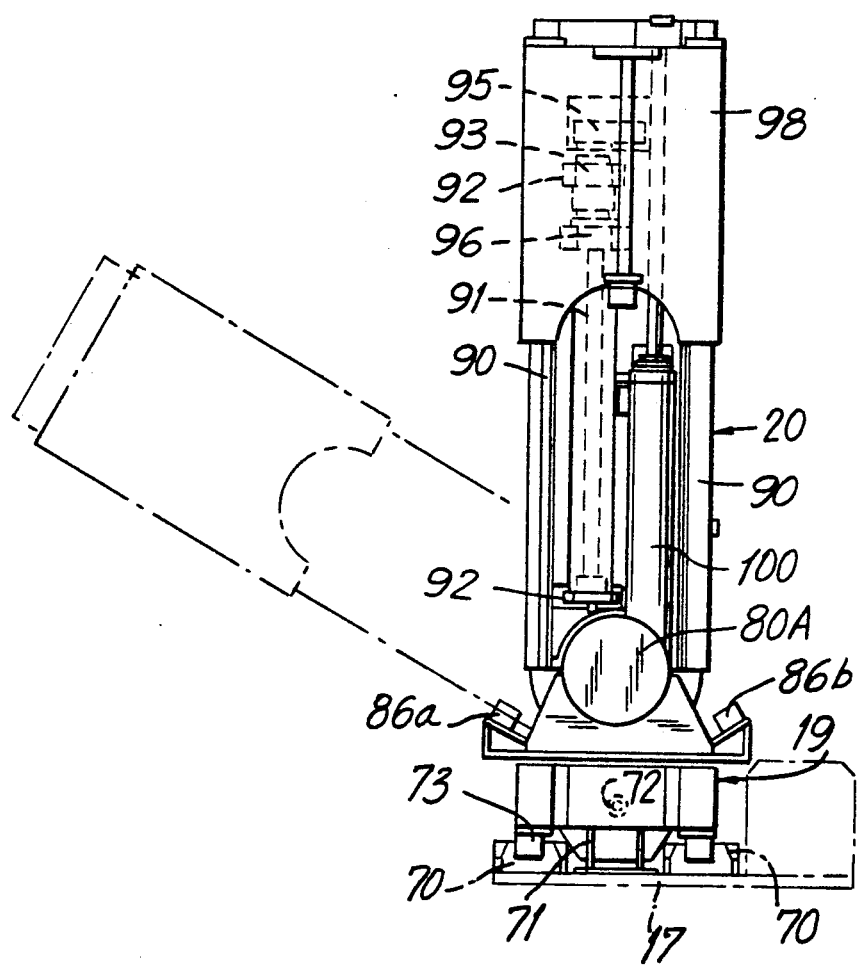

On the swivel table 17, as shown in FIG. 5 to FIG. 7, grooved guide members 70 are disposed in pairs, right and left and front and rear (in FIG. 7), and a ball nut 71 is disposed between the guide members 70.

A ball screw 72 engaging with the ball nut 71 is placed on the guide members 70 in the longitudinal direction in the cylindrical second slide table 19 supported through the guide rails 73.

The front and rear sides of the ball screw 72 are rotatably supported by front and rear bearings 74a and 74b of the second slide table 19, and its rear end is connected to the output shaft of a servo motor 76 mounted to the rear end of the second slide table 19 through a coupling 75.

Therefore, the second slide table 1 horizontally moves on the guide members 70 by way of fourth drive means comprising the servo motor 76, the coupling 75, the ball screw 72, and the ball nut 71.

The first electrode 18 is disposed at the front end of the second slide table 19 through an electrode bracket 77. The first electrode 18 is preferably mounted to an electrode mounting unit 78 so as to be vertically movable relative to the electrode bracket 77.

Furthermore, as shown in FIG. 5 to FIG. 7, large and small bearing members 80A and 80B are mounted on the second slide table 19 with a predetermined distance in the longitudinal direction, and support shafts 81A and 81B protruding from front and rear bottoms of the swing column 20 are supported on the bearing members 80A and 80B through bearings 82A and 82B.

The output shaft of a servo motor 84 mounted to the rear end of the rear bearing member 80B is connected to the rear end of the rear support shaft 81B through a speed reducer 83 mounted to the bearing member 80B.

Therefore, the swing column 20 swings in the direction perpendicular to the axis of the ball screw 72 by way of fifth drive means comprising the servo motor 84, the speed reducer 3, and the support shafts 81A and 81B.

An air cylinder 85 for weight balance is disposed between the top end of the swing column 20 and the rear bearing member 80B, and stoppers 86a and 86b to define the swing ends of the swing column 20 are mounted to the right and left ends of the second slide table 19. In FIG. 5, numeral 87 indicates a photoswitch to detect the origin of rotational angle and the rotation end of the swing column 20.

Moreover, as shown in FIG. 5 to FIG. 7, right and left guide rails 90 and 90 are vertically disposed in front of the swing column 20, and a ball screw 91 is vertically disposed between the guide rails 90 and 90.

Both ends of the ball screw 91 are rotatably supported on a support bracket. Rotational force of a servo motor 94 mounted at the upper portion of the swing column 20 is transmitted to a bearing 93 mounted to the top end through a timing belt 95.

A ball nut 96 engaging with the ball screw 91 is disposed at the rear surface of a vertically movable bracket 98 which is supported on the guide rails 90 through a grooved guide member 97.

. The rear end of the slide arm 21 is connected to the upper surface of the vertically movable bracket 98 through a connecting case 99.

Therefore, the slide arm 21 is moved in the column longitudinal direction by way of sixth drive means comprising the servo motor 94, the timing belt 95, the ball screw 91, and the ball nut 96 through the connecting case 99 and the vertically movable bracket 98.

An air cylinder 100 for weight balance is disposed between the bottom end of the swing column 20 and the upper portion of the vertically movable bracket 98, located at the side of the ball screw 91.

Figure 8:
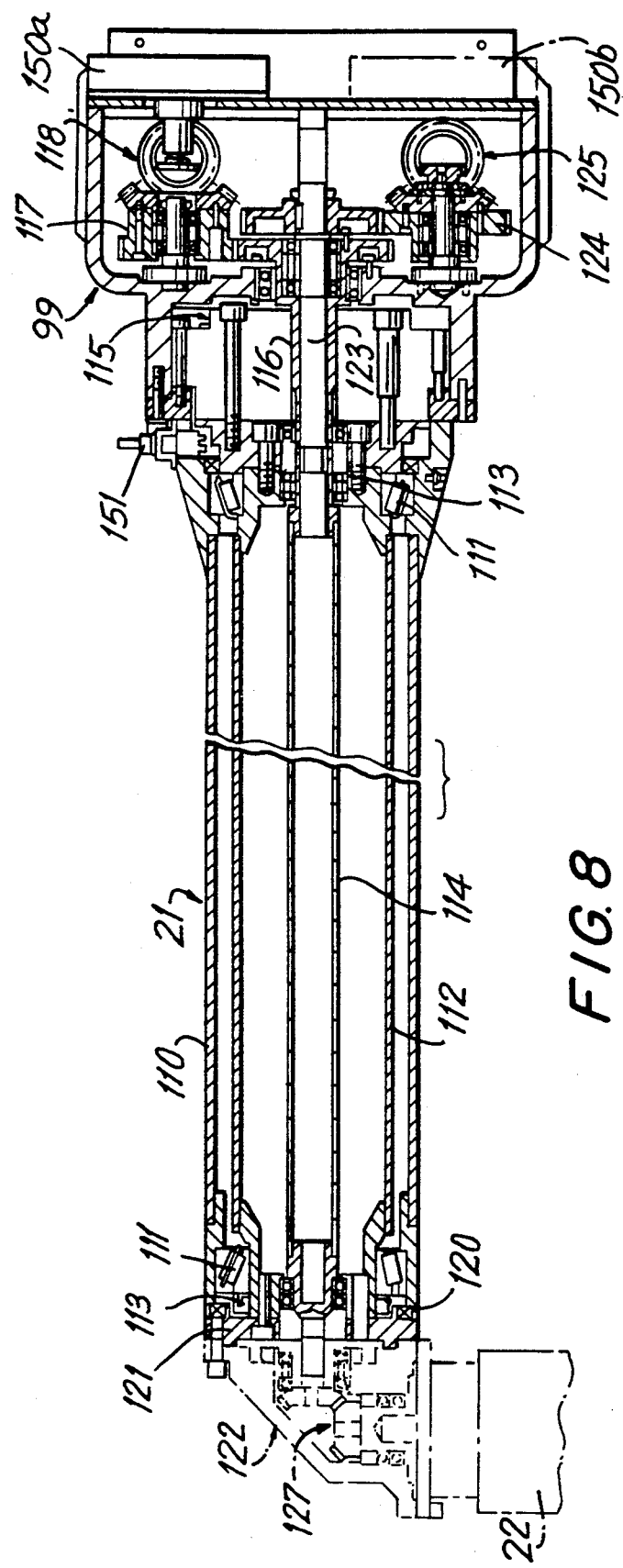
FIG. 8 and FIG. 9 are individually schematic cross-sectional and side views of a slide arm.
Figure 9:
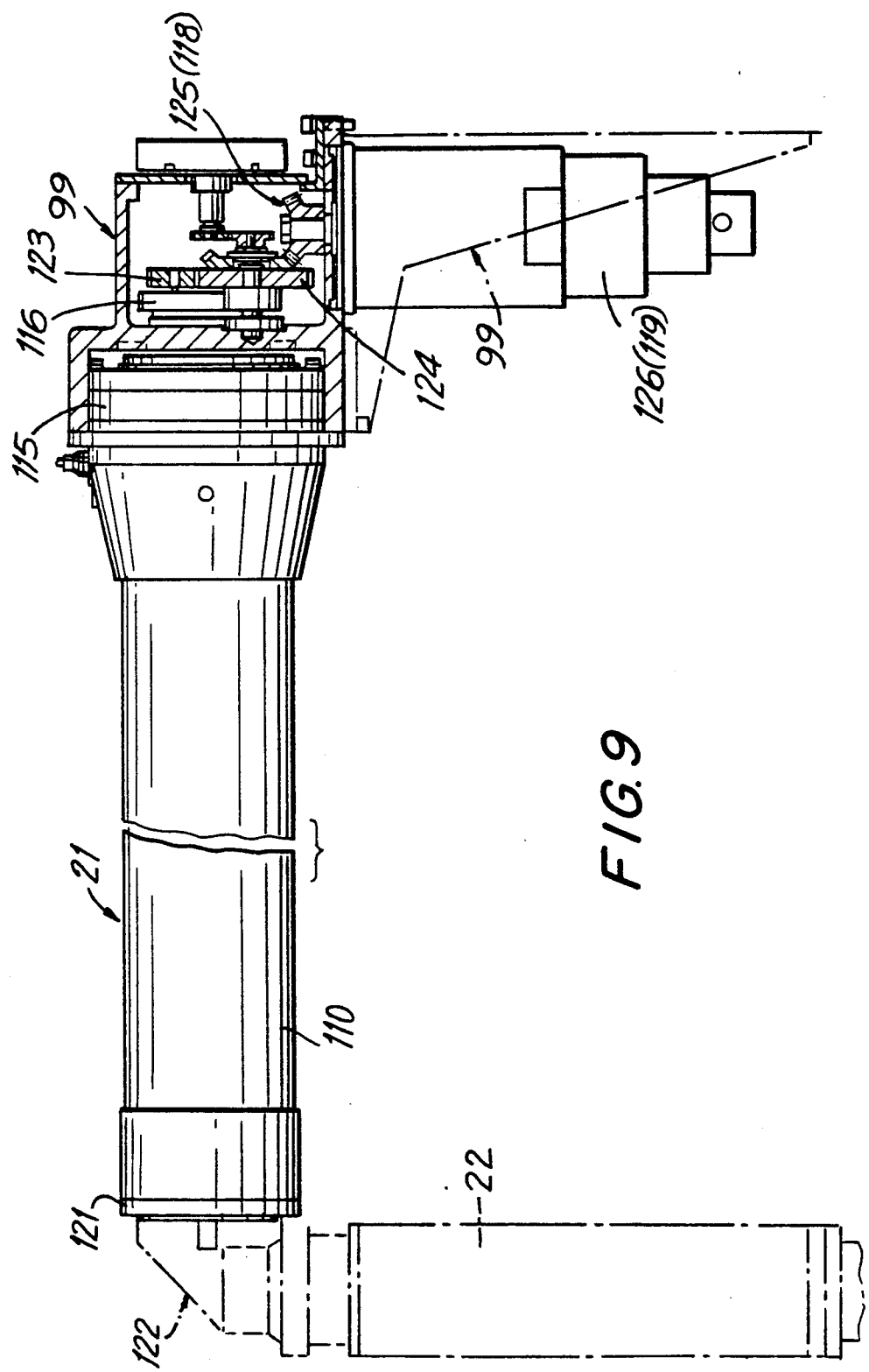

The slide arm 21, as shown in FIG. 8 and FIG. 9, has an outer cylinder 110 of which the rear end is integrally linked to the connecting case 99, an intermediate cylinder 112 rotatably supported on the outer cylinder 110 through a bearing 111, and an inner cylinder 114 rotatably supported on the intermediate cylinder 112 through a bearing 113.

The rear end side of the intermediate cylinder 112 is connected to the output shaft side of a speed reducer 115 incorporated in the connecting case 99, and the input shaft side of the speed reducer 115 is connected to the output shaft of a servo motor 119 for D-axis mounted to the vertically movable bracket 98 through a first gear shaft 116, a first spur gear 117, and a first bevel gear mechanism 118 which are also incorporated in the connecting case 99.

The front end side of the intermediate cylinder 112 is connected to a ring-formed intermediate member 121 sliding with the front surface of the outer cylinder 110 through a sealing member 120, and the rear end side of the swing arm 22 is connected to the intermediate member 121 through the connecting case 12.

Therefore, the swing arm 22 swings in the vertical plane by way of seventh drive means comprising the servo motor 119, the first bevel gear mechanism 118, the first spur gear 117, the first gear shaft 116, the speed reducer 115, and the intermediate cylinder 112, through a connecting case 122 and the intermediate member 121.

The rear end side of the inner cylinder 114 is spline connected to a second gear shaft 123 which is rotatable in the first gear shaft 116, and teeth of the second gear shaft 123 is linked to the output shaft of a servo motor 126 for E-axis which is mounted to the vertically movable bracket 98 adjacent to the servo motor 119 for D-axis, through a second spur gear 124 and a second bevel gear mechanism 125 which are incorporated in the connecting case 99.

On the other hand, the front end side of the inner cylinder 114 is spline connected to one gear of a bevel gear mechanism 127 incorporated in the connecting case 122.

Figure 10:
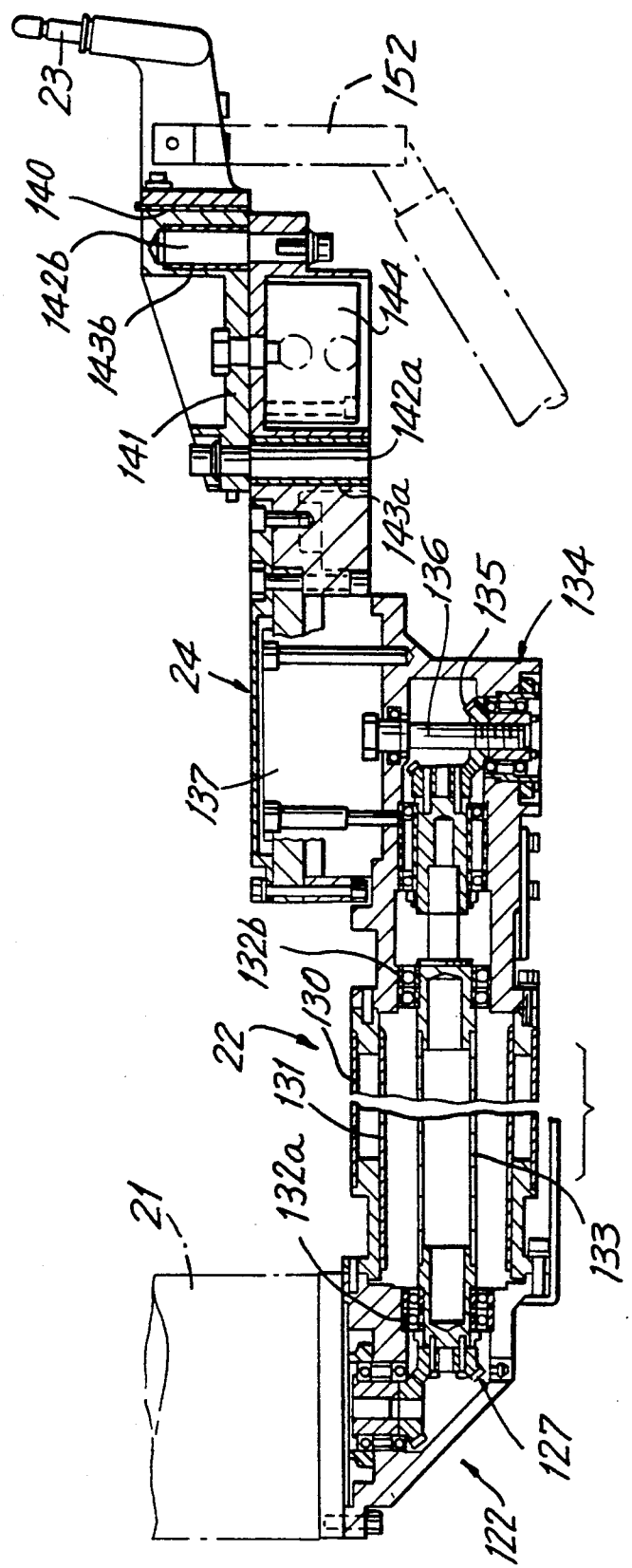
FIG. 10 is a schematic cross-sectional view of a swing arm.

The swing arm 22, as shown in FIG. 10, has an outer cylinder 130 and an intermediate cylinder 131 of which the rear end side is integrally connected to the connecting case 122, and an inner cylinder 133, of which the rear end side is rotatably supported on the connecting case 122 through a bearing 132a, integrally connected to the other gear side of the bevel gear mechanism 127.

The front end side of the outer cylinder 130 and the intermediate cylinder 131 is integrally connected to one end surface of a connecting case which supports the electrode bracket 14 at its one side surface. On the other hand, the front end side of the inner cylinder 133 is spline connected to one gear of a bevel gear mechanism 135 rotatably supported on the connecting case 134 through a bearing 132b and incorporated in the connecting case 134.

The other gear side of the bevel gear mechanism 135 is spline connected with the shaft end of a gear shaft 136, and teeth of the gear shaft 136 are connected to the input shaft side of a speed reducer 137 which protrudes from one side surface of the connecting case 134 and incorporated in the electrode bracket 24. The output shaft side of the speed reducer 137 is connected to the electrode bracket 24.

Therefore, the electrode brackets swings in the vertical plane by way of eighth drive means comprising the servo motor 126, the second bevel gear mechanism 125, a second spur gear 142, the second gear shaft 123, the inner cylinder 114, the bevel gear mechanism 127, the inner cylinder 133, the bevel gear mechanism 135, the gear shaft 136, and the speed reducer 137.

Furthermore, as shown in FIG. 10, the electrode bracket 24 is mounted to be detachable in the horizontal direction (vertical direction in FIG. 10) with an electrode mounting unit 141 mounting the second electrode 23 through an insulating plate 140, through two guide rods 142a and 142b and bushings 143a and 143b. The piston rod front end of an air cylinder incorporated in the electrode bracket 24 is connected to the electrode mounting unit 141.

Therefore, the second electrode 23 withdrawably opposes the first electrode 18 by way of ninth drive means comprising the air cylinder 144 and guide rods 142a and 142b.

In FIG. 8, numerals 150a and 150b individually indicates photoswitches for detecting the origin and rotational angle of the output shaft of the servo motors 119 and 126 which are adjacent to each other, and numeral 151 indicates a photoswitch for detecting the original position of the output shaft of the speed reducer 115. In FIG. 10, numeral 152 indicates a bus bar to apply a voltage to the second electrode 23.

In the two revolute welding robots 12 having the above-described mechanical structure, signal lines of sensors of the individual shafts (FIG. 11) and drive lines of air cylinders and servo motors are connected to a rod control panel (not shown) located at the side of the body assembly line.

This robot control panel is of a teaching playback type using microprocessors to control operations of the two welding robots.

In the welding robots 12, when the position of the second electrode 23 relative to the center of B-axis (center of swinging of the swing column 20) is previously registered in the movable ranges of D-axis and E-axis (that is, the swing arm 22 and the electrode bracket 24), the second electrode 23 can be moved to the registered position by operating a pushbutton to move the D-axis and E-axis, independent of the positions of the B-axis, D-axis, and E-axis (that is, the swing column 20, the slide arm 21, the swing arm 22, and the electrode bracket 24).

Using this function, since the second electrode can be moved independent of the first electrode at the teaching, positioning of both electrodes is achieved. Prior to this, the position of the second electrode 23 must be made in line with the position of the first electrode 18 and registered (this is called preparation for positioning and is performed every time the robot is relocated or the gun tip is repaired).

The positioning involves threee degress of freedom of C-, D-, and E-axes of the robot arm. However, in this robot 12, in view of body disturbance and operator's workability at positioning, positioning is possible with two degrees of freedom of D- and E-axes. In this case, in addition to positioning with respect to the position of the first electrode 18 in which the second electrode 23 is moved to the registered position set by the preparation for positioning by combined movements of D- and E-axes, positioning with respect to the second electrode 23 is possible in which the first electrode 18 is moved to the position of the second electrode 23 by combined movements of X-, Y-, Z-, D-, and E-axes, without moving the second electrode 23.

With the above arrangement, the welding robot 12 according to the present invention has four degrees of freedom in the robot arm unit (B-axis, C-axis, D-axis, and E-axis in FIG. 11) in addition to four degrees of freedom in the robot main unit (X-axis, Z-axis, A-axis, and Y-axis in FIG. 11), and all of the axes are driven by servo motors.

As a result, the robot is easily and precisely adapted to a number of vehicle models and variations.

Figure 12A:
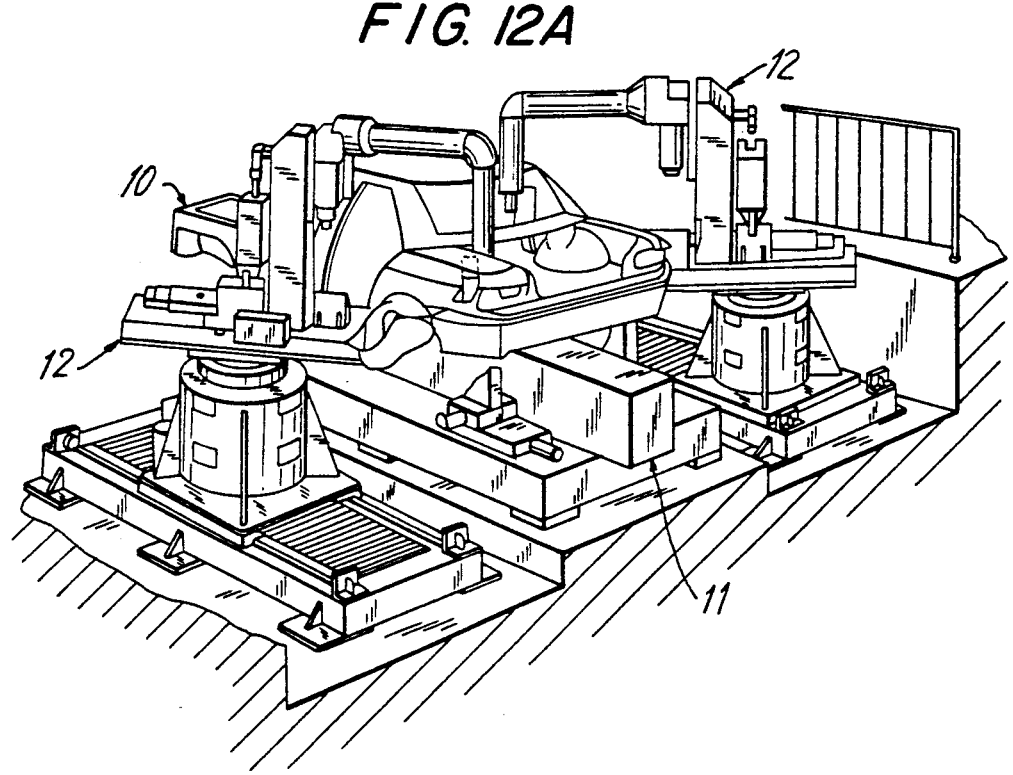
FIGS. 12(A) and (B) are schematic perspective views of a vehicle body assembly line showing different operation conditions of a welding robot.

For example, for a 4-door model having a rear shelf, as shown in FIG. 12(A), the front and rear portions of the perimeter can be welded in alternation by inserting the robot arm unit of one welding robot 12 from the trunk lid opening and the robot arm unit of the other welding robot 12 from the rear window opening. In this case, as described above, it is preferable to perform positioning with respect to the second electrode 23.

Figure 12B:
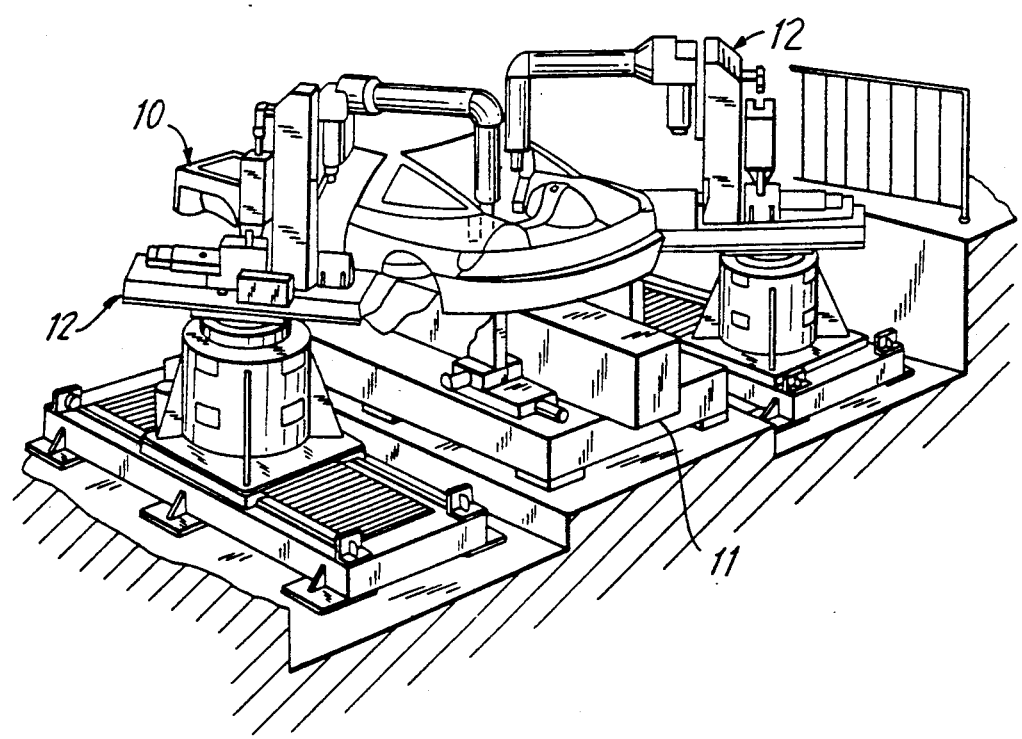
Figure 13A:
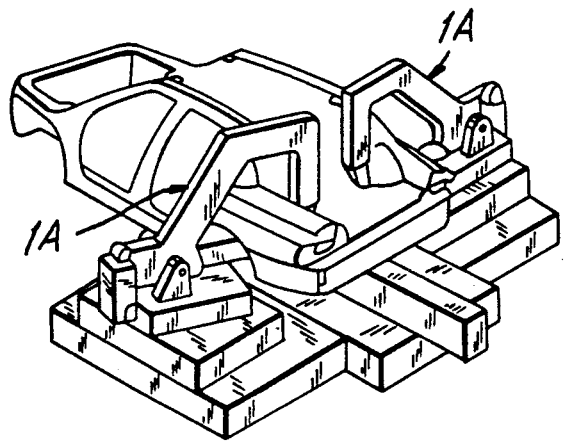
FIGS. 13(A), (B), and (C) are schematic perspective views of vehicle body assembly lines showing different prior art processes.
Figure 13B:
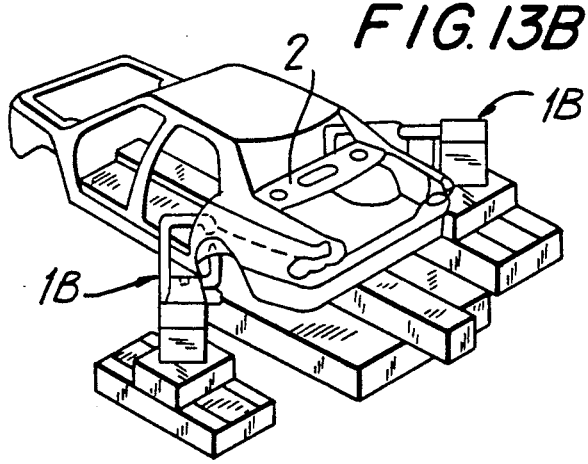
Figure 13C:
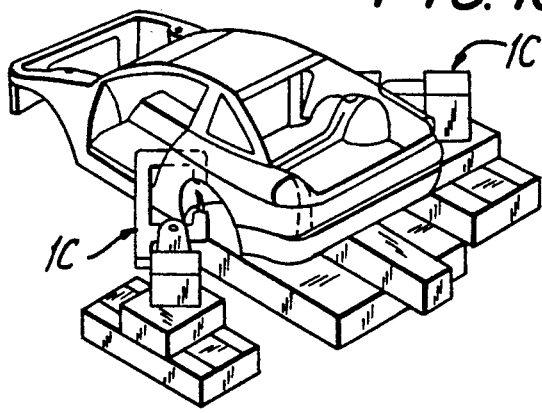

For a 2-door model, as shown in FIG. 12(B), the front and rear portions of the perimeter can be welded in alternation by inserting the robot arm units of both welding robots 12 from the tail gate opening. In this case, as described above, it is preferable to perform positioning with respect to the first electrode 18.

Needless to say that the present invention is not restricted to the above embodiments, and various modifications are possible within the scope of the subject matter such as those of the first to ninth drive means.

As described above, with the present invention, the robots can be adapted for a number of vehicle models and variations by increasing the degree of freedom of the robot arm units, thereby providing improved productivity due to a reduction in process steps.

What is claimed is:

1. A revolute welding robot comprising a base table provided with a first electrode at one end, base table moving means for supporting said base table and for moving said base table between a working position for welding work and a standby position withdrawn from the working position for waiting until feeding of a workpiece, a column with its rear end supported on said base table and its front end extending upward, a slide arm with its rear end supported movable in the longitudinal direction of said column and its front end extending in the same direction as said first electrode, slide arm drive means disposed between said column and said slide arm for driving said slide arm, a swing arm with its rear end rotatably connected to the front end of said slide arm end extending in a direction perpendicular to said slide arm, swing arm drive means disposed between said swing arm and said slide arm for driving said swing arm, an electrode bracket with its rear end rotatably supported at the front end of said swing arm and provided with a second electrode opposing said first electrode provided at the front end extending in the same direction as said swing arm, electrode bracket drive means disposed between said electrode bracket and said slide arm for driving said electrode bracket, and electrode moving means disposed on at least one of said base table and said electrode bracket for driving at least one of said first and second electrodes to the other to a welding position, whereby pressing a plurality of work panels between said electrodes for welding.

2. The revolute welding robot of claim 1 wherein rear end of said column is swingably supported on said base table through a bearing member and driven by column drive means disposed between said base table and said column.

3. The revolute welding robot of claim 1 wherein said base table moving means comprises a bed having a rail disposed on the floor surface along and at the side of an assembly line and extending parallel to said assembly line, a first slide table guided by said rail of said bed and supported on said bed to be horizontally movable parallel to said assembly line, first drive means disposed between said first slide table and said bed for driving said first slide table, a vertically movable member supported on the first slide table to be movable in a vertical direction, second drive means disposed between said vertically movable member and said first slide table for driving said vertically movable member, a swivel table rotatably disposed horizontally at the top end of said vertically movable member and supporting on its upper surface said base table to be movable straight in a horizontal plane, third drive means disposed between said swivel table and said vertically movable member for driving said swivel table, and fourth drive means disposed between said swivel table and said base table.

4. The revolute welding robot of claim 1 wherein rear end of said column is swingably supported on said base table through a bearing member and driven by column drive means disposed between said base table and said column, and said base table moving means comprises a bed having a rail disposed on the floor surface along and at the side of an assembly line and extending parallel to said assembly line, a first slide table guided by said rail of said bed and supported on said bed to be horizontally movable parallel to said assembly line, first drive means disposed between said first slide table and said bed for driving said first slide table, a vertically movable member supported on the first slide table to be movable in a vertical direction, second drive means disposed between said vertically movable member and said first slide table for driving said vertically movable member, a swivel table rotatably disposed horizontally at the top end of said vertically movable member and supporting on its upper surface said base table to be movable straight in a horizontal plane, third drive means disposed between said swivel table and said vertically movable member for driving said swivel table, and fourth drive means disposed between said swivel table and said base table for straightly driving said base table.

5. The revolute welding robot of claim 3 wherein said first drive means horizontally moves said first slide table by a ball screw incorporated in said bed and rotated by a servo motor through a timing belt and a ball nut engaging with said ball screw incorporated in said first slide table.

6. The revolute welding robot of claim 3 wherein said second drive means vertically moves said vertically movable member by a ball screw incorporated in said first slide table and rotated by a servo motor through a timing belt and a ball nut incorporated in said vertically movable member and engaging with said ball screw.

7. The revolute welding robot of claim 3 wherein said third drive means horizontally turns said swivel table by transmitting a rotation force of a servo motor mounted on said swivel table through a bevel gear mechanism and a timing belt to an input shaft side of a speed reducer incorporated in said vertically movable member.

8. The revolute welding robot of claim 3 wherein said fourth drive means horizontally moves said base table by a ball screw incorporated in said base table and rotated by a servo motor through a coupling and a ball nut mounted on said swivel table and engaging with said ball screw.

9. The revolute welding robot of claim 2 wherein said column drive means swings said column by transmitting rotation force of a servo motor mounted onto said base table to one of a pair of supporting shafts, protruding from a lower portion of said column and supported on a bearing member mounted on said base table, through a speed reducer.

10. The revolute welding robot of claim 1 wherein said slide arm drive means moves said slide arm in the longitudinal direction of said column by a ball screw mounted to said column and rotated by a servo motor through a timing belt and a ball nut mounted to said slide arm and engaging with said ball screw.

11. The revolute welding robot of claim 1 wherein said swing arm drive means swings said swing arm in a vertical plane by transmitting rotation force of a servo motor mounted to the rear end side of said slide arm to a connecting case integrally mounted to the rear end side of said swing arm through a first bevel gear mechanism, a first spur gear, a first gear shaft, a speed reducer, and an intermediate cylinder.

12. The revolute welding robot of claim 1 wherein said electrode bracket drive means swings said electrode bracket in a vertical plane by transmitting rotation force of a servo motor mounted to the rear end side of said slide arm to an input shaft side of a speed reducer incorporated in said electrode bracket through a second bevel gear mechanism, a second spur gear, a second gear shaft, and an inner cylinder, and further through a bevel gear mechanism, an inner cylinder, a bevel gear mechanism, and a gear shaft incorporated in said swing arm.

13. The revolute welding robot of claim 1 wherein said electrode drive means drives a second electrode mounting portion detachably mounted to said electrode bracket through a guide rod by an air cylinder incorporated in said electrode bracket.

14. The revolute welding robot of claim 3 further comprising a plurality of air cylinders for weight balance disposed between the upper surface of said first slide table and the top end of said vertically movable member.

15. The revolute welding robot of claim 2 further comprising an air cylinder for weight balance disposed between the top end of said column and the upper surface of said base table.

16. The revolute welding robot of claim 1 further comprising an air cylinder for weight balance disposed between the bottom end of said column and the rear end of said slide arm.

17. The revolute welding robot of claim 1 wherein an electrode mounting portion mounting said first electrode is movable in the vertical direction relative to said base table.

* * * * *